United States Patent [19]

Lohkamp

[11] Patent Number: 4,822,546

[45] Date of Patent: Apr. 18, 1989

[54] DIE DESIGN FOR UNDERWATER PELLETIZATION OF HIGH FLOW RATE POLYMERS

[75] Inventor: Dwight T. Lohkamp, Baytown, Tex.

[73] Assignee: Exxon Chemical Patents Inc., Linden, N.J.

[21] Appl. No.: 82,755

[22] Filed: Aug. 6, 1987

[51] Int. Cl.⁴ .................... B29B 11/10; B29C 47/12
[52] U.S. Cl. .................... 264/143; 264/178 F; 425/67; 425/311; 425/313; 425/463; 425/382.4
[58] Field of Search ................ 264/141–143, 264/178 F, 210.8; 425/67–68, 71, 382 R, 311, 313, 463, 464, 382.4

[56] References Cited

U.S. PATENT DOCUMENTS

| | | | |
|---|---|---|---|
| 3,849,241 | 11/1974 | Butin et al. | 264/210.8 |
| 3,949,039 | 4/1976 | Yamamoto et al. | 264/142 |
| 3,981,959 | 9/1976 | Cuff | 264/178 F |
| 4,138,208 | 2/1979 | Heckeroth | 425/382 R |
| 4,321,026 | 3/1982 | Lambertus | 425/313 |
| 4,347,206 | 8/1982 | Roberts | 264/210.8 |
| 4,380,570 | 4/1983 | Schwarz | 425/80.1 |
| 4,461,737 | 7/1984 | Voss | 264/142 |

FOREIGN PATENT DOCUMENTS

| | | | |
|---|---|---|---|
| 57-178809 | 11/1982 | Japan | 264/142 |
| 61-195808 | 8/1986 | Japan | 264/142 |

*Primary Examiner*—Jeffery Thurlow
*Attorney, Agent, or Firm*—M. B. Kurtzman

[57] ABSTRACT

High melt flow rate polymers are pelletized with greater uniformity and less malformed pellets from underwater extrusion process by die orifices having a narrow preland sufficient to evenly distribute the polymer followed by a wide final hole that forms a polymer strand sufficient to avoid deformation by water currents during pelletization.

24 Claims, 1 Drawing Sheet

DIE DESIGN FOR UNDERWATER PELLETIZATION OF HIGH FLOW RATE POLYMERS

BACKGROUND OF THE INVENTION

This invention relates to the pelletization of polymers, and more specifically to the design of dies for underwater pelletization of high melt flow rate polymers.

High melt flow rate polymers are very fluid during extrusion and are frequently extruded and pelletized under water. Underwater pelletization provides for sufficient surface cooling of the individual pellets to prevent agglomeration.

Underwater pelletization is typically used for polyethylenes having a melt index (MI) from 0.1 to 500 (ASTM D1238, Condition E) and for polypropylenes having a melt flow rate (MFR) from 0.5 to 100 (ASTM D1238, Condition L). Dies for underwater pelletization of polymers have a plurality of orifices arranged on an annular cutting surface such that rotating knife blades can cut the polymer strands shortly after the polymer is extruded from the orifices. The shape of the orifices in a conventional die generally consists of a circular hole with an initial large diamter preland and a narrower diameter final hole. A gradual transition from the preland to the final hole is typically incorporated to prevent buildup of hardened polymer in the orifice.

The production of ultra high melt flow rate (UHMFR) grade polymers is difficult because of pelletizing problems. A UHMFR polymer has a MFR of about 50 or greater. The MFR of a UHMFR polymer can be as high as 2000 or greater. UHMFR polymers are particularly useful for the production of non-woven fabrics by melt blown fiber processes. To be usefully employed in commercial processing equipment the UHMFR polymer must first be prepared as a pellet feed stock. Polypropylenes having a MFR above about 40 are particularly difficult to pelletize.

Attempts to pelletize UHMFR polypropylenes with conventional underwater pelletization systems result in an excess amount of non-uniform pellets, malformed pellets including tailed pellets, long pellets, elbows, dog bones, and pellet trash. Malformed and non-uniform pellets are undesirable since they tend to bridge in pellet feed hoppers and to block pellet conveying systems. Further, significant amounts of malformed pellets alter the bulk density of the pellet stock which causes feeding problems in the extrusion line and which may result in voids in the final product. In addition to malformed pellets, trashouts occur frequently during production of ultra high MFR polypropylene. Trashouts are extruder shutdowns resulting from polymer buildup on the rotating knives.

Ultra high melt flow rate polypropylene pellets have been produced with fewer malformed pellets by a process known as strand chopping. For strand chopping, the molten polymer strands are extruded into a water trough having little or no currents and eddies. The cooled strands are then passed through a strand chopper which cuts the strands into cylindrical pellets. Although spherical pellets would be more uniform, the cylindrical pellets are known to have fewer malformed pellets, and thus fewer problems with plugging of pellet conveying equipment and with measuring polymer feed by volume. Strand chopping pelletization units are limited to low throughputs because it is difficult to keep the strands separated. Therefore, it is desirable to develop technology for underwater pelletizing of high MFR polymers.

SUMMARY OF THE INVENTION

The formation of malformed pellets from an ultra high MFR polymer by underwater pelletization procedures is believed to be caused in part by the underwater pellet cutting operation. When high melt index polymers are pelletized underwater, the polymer strands exiting the extruder are cut by rotating knives before solidifying so that the pellets can assume a near spherical shape. The rotating knives are believed to create water currents and eddies that impinge on and deform the polymer melt strands as they exit from the die orifices before being cut. High MFR polymer deforms easily because it has a very low viscosity. In addition to deforming, the high MFR polymer tends to form fibers which results in tails and incomplete pellet cuts.

The present invention provides an improved die design for underwater pelletization of high MFR polymers. In the die design of the invention, die orifices are provided which have a narrow diameter preland that expands to a wider diameter final hole in the direction of flow of the molten polymer. The mechanism for the improvement is not well understood. One theory is that the wider diameter final holes produce large diameter polymer strands that have greater resistance to deformation by water currents, the narrow diameter prelands of the die orifice provide uniform flow of polymer to the wide diameter final holes of the die orifice. For high melt flow rate polymers, the final holes of the die orifices are preferably about 3.2 millimeters in diameter and the prelands of the die orifices are preferably about 1.7 millimeters in diameter and about 15 to 21 millimeters in length.

DETAILED DESCRIPTION OF A PREFERRED EMBODIMENT

High melt flow rate or high melt index polymers can be produced directly in a polymerization reactor. High melt index or melt flow rate polymers are also sometimes prepared from lower melt index polymers by the addition of peroxide to the polymer in an extruder. The conversion of a lower melt index polymer to a high or ultra high MFR material is accomplished as a part of the pelletizing procedure by adding peroxide to the polymer in the extruder which feeds the pelletizing die. The desired MFR value for the extruded/pelletized product polymer is determined and controlled by selection of appropriate extrusion temperatures, residence time in the extruder, and quantity of peroxide added. By appropriate control of such parameters the desired MFR for the polymer is attained while it is in the melt state within the extruder barrel such that the material supplied to the pelletizing die is at the desired MFR value when extruded from the die to be pelletized by the rotating knives.

The melt index of a polymer is determined by ASTM D1238, Condition E (190° C., 2.16 kg load). The melt flow rate of a polymer is determined by ASTM D1238, condition L (230° C., 2.16 kg load). The determination of melt flow rate is less accurate for polymers having a high melt flow rate. The determination of melt flow rate is improved for high melt flow rate polymers by decreasing the size of the orifice in the standard melt flow rate test apparatus. The underwater pelletization die of this invention is useful for the pelletization of a reactor produced high MFR polymer as well as for a high MFR polymer made by conversion of a low melt index material during the course of a pelletization process.

Figure 1:
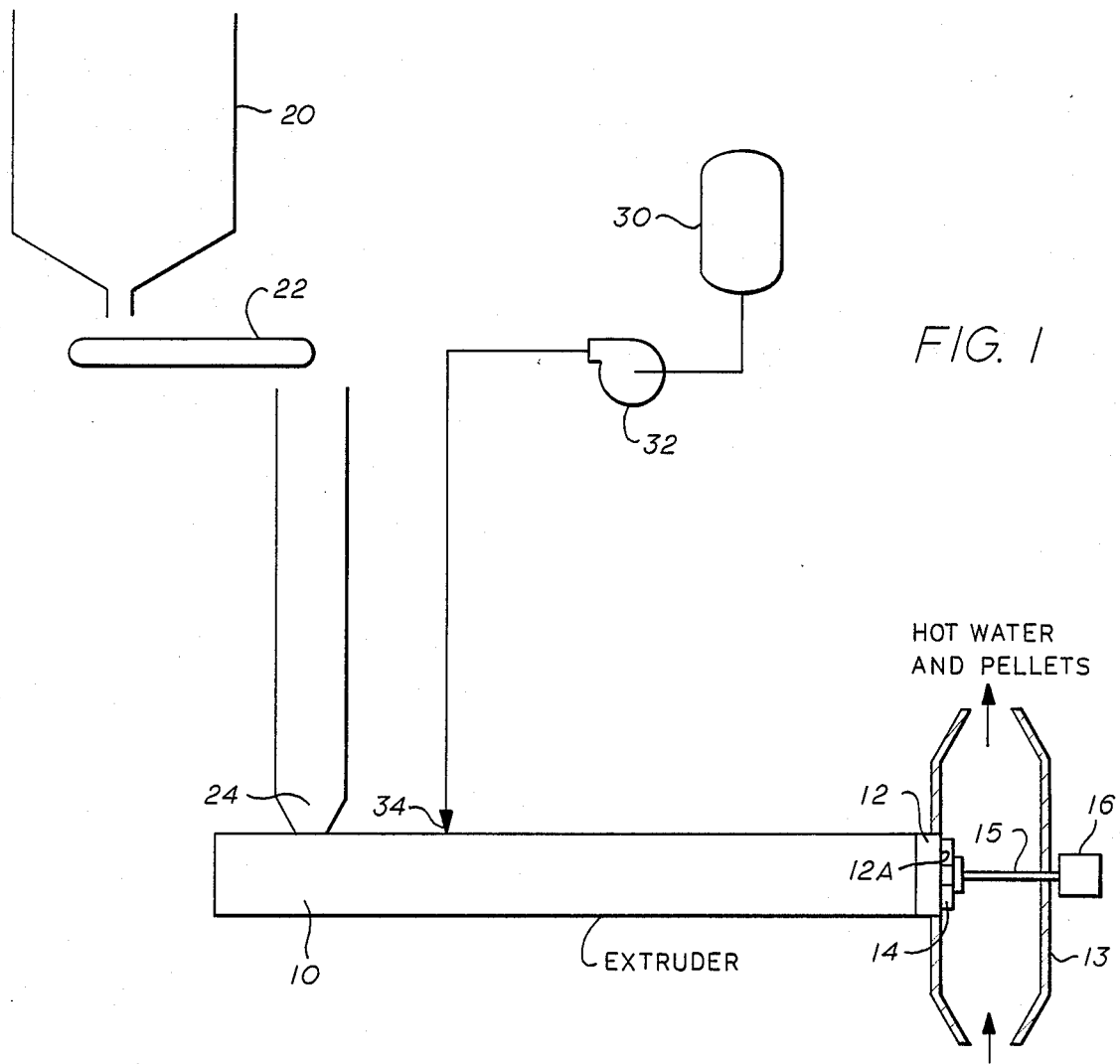
FIG. 1 is an illustration of an underwater pelletization extrusion process having a die 12 of the present invention.

The high melt flow polymers are preferably prepared by extrusion as part of an underwater pelletization process as illustrated in FIG. 1. A conventional extruder 10 having internal means for melting and mixing the polymer and an exit 12 die is mounted adjacent to and for communication with a water quenching chamber 13. The die 12 has an outer face or discharge side 12a which is exposed to water that is flowed through the quenching chamber 13. A rotating knife 14 for cutting polymer strands discharged through the die 12 is connected by a shaft 15 to a drive motor 16. The discharging polymer strands are cut into pellets which are carried away from the die face 12a by the water flowing through the quenching chamber 13. Hot water, on the order of from about 30° C. to about 80° C., is preferred for the quenching system. Pellet size and shape are related to the properties of the polymer, the temperature of the melt and the die, the size of the orifices exiting the die 12, the velocity of the strand, and the number and speed of rotating knives 14.

Polymer stock from a feed hopper 20 is conveyed by conveying means 22 to a polymer inlet 24 on extruder 10. The polymer feed stock can have the desired MFR or it can be converted in the extruder to a high MFR polymer by the addition of peroxide from peroxide tank 30. A pump 32 conveys the peroxide from tank 30 to a peroxide inlet 34 on the extruder. Alternately, the peroxide may be mixed with the resin feed. The melt flow rate of the polymer is controlled to the desired value by controlling the temperature of the extruder, the amount of peroxide added to the extruder 10, and the retention time of the polymer and peroxide within the extruder 10.

Figure 2:
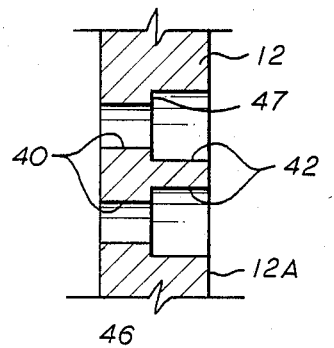
FIG. 2 illustrates in cross-sectional view a die of the present invention wherein the die orifices have a narrow diameter product adjacent the compression side of the die that expands to a wider diameter final hole adjacent the discharge side of the die in the direction of flow of the molten polymer.
Figure 3:
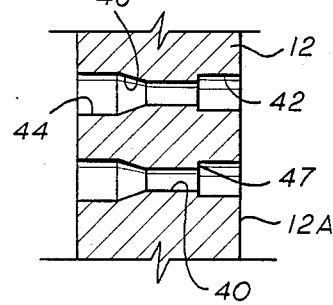
FIG. 3 illustrates an alternate embodiment for the die orifice having an initial large diameter opening adjacent the compression side of the die in accordance with the present invention.
Figure 4:
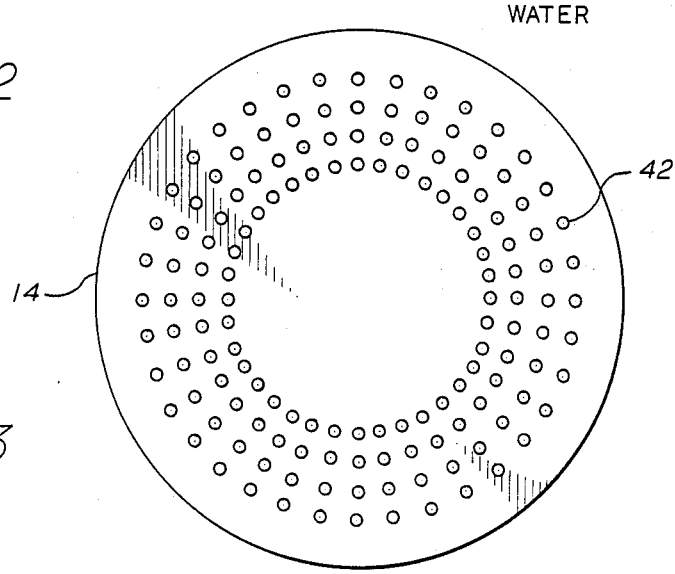
FIG. 4 illustrates a typical pattern of orifices in a die in accordance with the present invention.

FIG. 2 illustrates in cross-section a design of the die orifices of die 12. In accordance with the present invention each die orifice is formed with a narrow diameter preland 40 which precedes a wider diameter final hole 42 which communicates with the discharge side 12a of die 12. An alternate embodiment in FIG. 3 provides an initial large diameter opening 44 to communicate the compression side of die 12 to the preland 40 and then to the final die orifice 42. A tapered surface 46, preferably having an angle of 30° with respect to the axis of the die orifice, joins the initial opening 44 to the preland 40 of a die orifice to prevent accumulation of hardened polymer at the entrance to the preland 40 of the die orifice and to improve the polymer distribution. A transition surface 47 from the preland hole 40 to the final hole 42 can be sharp as shown in FIGS. 2 and 3. In the alternative, the transition surface 47 may be tapered to eliminate dead space which may accumulate hardened polymer.

The narrow diameter preland 40 of the die orifice in the die 12 has a diameter and length sufficient to provide substantially even flow of high melt flow rate polymers to all the die orifices in the die 12. The final holes 42 of the die orifices have a diameter sufficient to form polymer melt strands that are resistant to deformation by the water currents created by the rotating knives 14. The polymer melt strands typically expand to a larger diameter as they discharge from a die orifice, therefore the final hole 42 of a die orifice can be smaller than the desired final diameter of the polymer strand prior to cutting.

The range of diameters and lengths of the preland 40 and the final hole 42 which provide satisfactory pellets of high melt flow rate polymer varies depending on the temperature and viscosity of polymer exiting the die 12. However, for any given condition of temperature and viscosity, the die design of the present invention produces better pellets than conventional dies.

Ultra high melt flow rate pellets were produced on lab and commercial scale extruders using dies having orifices in accordance with the present invention. The following examples illustrate the operation of lab and commercial extruders and are not intended to limit the invention to specific equipment or methods of operation.

EXAMPLES

Examples 1 through 7 were conducted on a lab scale Werner Pfleiderer ZSK 57 extruder with a Gala Model 6 underwater pelletizer. Examples 1 and 2 were conducted with 12 orifices of a conventional die of the Gala Model 6 pelletizer, each orifice having a 6.4 mm diameter preland and a 2.4 mm diameter final hole. Examples 3 and 4 were conducted with 12 orifices of a conventional Gala 6 die having a 6.4 mm diameter preland and a 3.2 millimeter diameter final hole. Examples 5 and 6 were conducted with 12 orifices of a modified Gala 6 die having metal inserts placed in the prelands resulting in initial openings 44 of 6.4 mm diameter, preholes 40 of 1.7 mm diameter and 20.6 mm long, and final holes 42 of 2.4 mm diameter. For Examples 5 and 6, the transition 46 between the initial opening 44 and the preland 40 was flat. Example 7 was conducted with orifices similar to orifices of Examples 5 and 6 except that the transition 46 between the initial opening and the preland was tapered at approximately 30° with respect to the axis of the orifice such that the total length of the transition 46 and the preland 40 was 20.6 mm with the preland 40 being about 15.2 mm long. Experiments were conducted with two different polypropylene feeds, one having a melt flow rate of 10 and the other having a melt flow rate of 40. Peroxide was fed to the extruder in the form of a polymer/peroxide mix having 2% peroxide in the form of Lupersol 101[1]. Variations in polymer and peroxide feed and in the pellet products are described in Table I.

[1] Lupersol 101 is a registered trademark of Pennwalt for 2,5-Dimethyl-2,5-bis(t-Butylperoxy)hexane.

TABLE I

LAB SCALE EXAMPLES OF UNDERWATER PELLETIZATION

| Example No. | Orifice Diameters, mm | | | Polymer Feed | | Polymer/Peroxide Mix | Product Pellets | |
|---|---|---|---|---|---|---|---|---|
| | Initial Opening | Preland | Final Hole | MFR | lb/hr | lb/hr | MFR | Quality[a] |
| 1.* | 6.4 | 6.4 | 2.4 | 10 | 130 | 16 | 444 | Fair |
| 2.* | 6.4 | 6.4 | 2.4 | 40 | 130 | 15 | 533 | Poor |
| 3.* | 6.4 | 6.4 | 3.2 | 10 | 130 | 10 | 262 | Very poor |
| 4.* | 6.4 | 6.4 | 3.2 | 40 | 130 | 10 | 307 | Poor |
| 5.* | 6.4[b] | 1.7 | 3.2 | 10 | 130 | 20 | 533 | Good |
| 6. | 6.4[b] | 1.7 | 3.2 | 40 | 130 | 25 | 799 | Average |
| 7. | 6.4[c] | 1.7 | 3.2 | 40 | 147 | 53 | 1332 | Good |

*Comparison examples illustrating conventional dies
[a]Pellet Quality Visual Scale:
GOOD - some tails possible
AVERAGE - A few misshapen pellets
FAIR - Some elongation, elbows
POOR - Elbows, dog bones, elongation, etc.
VERY POOR - deformed, non-uniform size, agglomerated
[b]Flat entry from initial opening diameter to preland
[c]Tapered entry from initial opening diameter to preland Examples 1 through 7 were conducted with an extruder speed of 194 rpm. The temperature of the extruder 10 could be controlled at ten separate zones. Zones 1 through 4 were maintained at about 200° C. Zones 5 through 7 at about 170° C., zones 8 through 9 at about 200° C., and zone 10 at about 235° C. The molten polymer passed through a screen changer having a 20 mesh screen pack prior to exiting through the die 12. The polymer strands exiting the die 12 were cut by two knife blades 14 rotating at 3600 rpm and were discharged into a hot water stream that was maintained at a temperature of from about 32° C. to about 35° C.

Air was added to the extruder for both the commercial and lab examples. The injection of air into the extruder is believed to assist the peroxide in breaking down the polymer such that lower amounts of peroxide are required to achieve the desired melt flow rate when air is injected into the extruder.

The standard die having 3.2 mm diameter final holes (Examples 3 and 4) performed poorly. The standard die having 2.4 mm diameter final holes (Examples 1 and 2) produced poorly shaped pellets at higher melt flow rates. The die orifices having 1.7 mm diameter by 15.2 mm long preland 40 and a tapered transition 46 to the preland 40 (Example 7) produced good pellets having melt flow rates of about 1332. Comparing Examples 5 and 6 to Example 7, the tapered transitions 46 to the prehole 40 permitted higher polymer flow rates and peroxide flow rates than the 1.7 mm prelands 40 with flat transmissions from the initial openings 44.

Examples 8-10 were conducted on a commercial scale extruder 10 to determine if ultra high melt flow rate pellets could be obtained on commercial equipment. The extruder was a 12 inch diameter, 36:1 L/D single screw extruder. The highest MFR polypropylene previously produced using a conventional die was 325 MFR and in all cases pellet quality was poor or very poor (see note a in Table I). Large commercial single screw extruders equipped for underwater pelletization typically operate with screw speeds of between about 50 and 120 rpm. Pelletizers typically contain from 4 to 12 knives which can rotate from between 600 to 2000 rpm. Production capacities for commercial single screw extruders typically range from 4000 lbs per hour to about 15000 lbs per hour. Twin screw extruders with underwater pelletizers operate up to 50,000 lb/hr.

The temperature of the commercial scale extruder was controlled by eight separate zones for Examples 8-10 with zones 1-5 maintained between about 220° to about 240° C., zones 6 and 7 between about 120° to 105° C., and zone 8 at about 150° C. The extruder screw speed was about 60 rpm for Examples 8 and 9 and about 92 rpm for Example 10. The polymer passed through a screen changer having a 100 mesh screen pack before exiting through the die 12. The die was heated by 600 psig steam. The polymer strands exiting the die were cut by four knives 14 rotating at about 1700 rpm. The pellets were discharged in hot water having a temperature from about 35° to about 40° C.

A conventional heat exchange die having 468 holes with 2.4 mm diameter final holes was modified for Examples 8-10 to have prelands of 1.7 mm diameter by 18.3 mm long and final holes of 3.2 mm diameter. For Examples 8 and 9, polypropylene having a melt flow rate of 70 was fed to the extruder 10 at the rate of 5600 lbs/hour with the addition of peroxide in the amount shown in Table II. Good quality pellets having melt flow rates of about 900 and about 1250 were obtained with little waste material. For Example 10, the feed rate of the polypropylene was increased to 7750 lbs/hour. At the higher polymer feed rate, a peroxide feed rate of 11.1 lbs/hr produced good quality pellets having a melt flow rate of about 750.

TABLE II

COMMERCIAL SCALE EXAMPLES OF UNDERWATER PELLETIZATION

| Example No. | Die Orifice Diameters, mm | | | Polymer Feed | | Peroxide Feed | Product Pellets | |
|---|---|---|---|---|---|---|---|---|
| | Initial Opening | Preland | Final Hole | MFR | lb/hr | lb/hr[a] | MFR | Quality[b] |
| 8. | 4.77 | 1.7 | 3.2 | 70 | 5600 | 13.4 | 1249 | Good |
| 9. | 4.77 | 1.7 | 3.2 | 70 | 5600 | 9.8 | 906 | Good |
| 10. | 4.77 | 1.7 | 3.2 | 70 | 7750 | 11.1 | 753 | Good |

[a]Peroxide feed estimated from rpm of feed pump
[b]See Note a to Table I

The die design of the present invention successfully produces uniform, spherical pellets by evenly distributing the polymer to the die orifices of die 12 and by extruding larger, lower velocity polymer strands. Such uniform spherical pellets have the advantage of smooth pellet handling and uniform bulk density which heretofore has not been attainable with high melt flow polymers subjected to underwater pelletization with pelletization dies of conventional design.

The foregoing description of the present invention is explanatory and illustrative of a preferred embodiment and is not intended to limit the invention to specific sizes, shapes, or material of construction. Persons skilled in the art could readily devise alternate embodiments as well as variations in sizes, shapes and materials of construction without undue experimentation, and all such variations are considered to be within the scope of the invention which is limited only by the following claims.

What is claimed is:

1. A method for extruding a high melt flow rate polymer underwater, comprising the steps of:
   feeding the polymer to an extruder;
   melting the polymer in the extruder;
   discharging the polymer into water through a die having a plurality of orifices therein, each die orifice having a first portion defining a narrow preland followed by a second portion defining a wider final hole; and
   cutting the polymer strands into pellets as the strand exits the die.

2. The method of claim 1, wherein the polymer has a melt flow rate or a melt index greater than 1.

3. The method of claim 1, wherein the narrow preland of each orifice in the die has a diameter of about 1.7 millimeters and a length of about 15 to about 21 millimeters.

4. The method of claim 3, wherein the wider final hole of each orifice in the die has a diameter of about 3.2 millimeters.

5. The method of claim 1, wherein each orifice in the die has an initial large diameter opening that gradually decreases to the diameter of the narrow preland of the orifice.

6. The method of claim 1, further comprising the step of increasing the melt flow rate of the polymer in the extruder by feeding peroxide to the extruder.

7. The method of claim 6, wherein the polymer exiting the extruder has a melt flow rate greater than about 30.

8. The method of claim 7, wherein the narrow preland of each orifice in the die has a diameter of about 1.7 millimeters and a length of about 15 to about 21 millimeters.

9. The method of claim 8, wherein the wider final hole of each orifice in the die has a diameter of about 3.2 millimeters.

10. The method of claim 6, wherein each orifice in the die has an initial large diameter opening and a portion of gradually decreasing diameter that connects the initial large opening to the narrow preland of the orifice.

11. An apparatus for extruding a high melt flow rate polymer underwater, comprising:
    means for feeding the polymer to an extruder;
    means for melting the polymer in the extruder;
    a die having a plurality of orifices therein, each orifice having a first portion defining a narrow preland followed by a second portion defining a wider final hole;
    means for discharging the polymer into water through the die; and
    means for cutting the polymer strands into pellets as the strands exit the die.

12. The apparatus of claim 11, wherein the polymer has a melt flow rate or a melt index greater than 1.

13. The apparatus of claim 11, wherein the narrow preland of each orifice in the die has a diameter of about 1.7 millimeters and a length of about 15 to about 21 millimeters.

14. The apparatus of claim 13, wherein the wider final hole of each orifice in the die has a diameter of about 3.2 millimeters.

15. The apparatus of claim 11, wherein each orifice in the die has an initial large diameter opening that gradually decreases to the diameter of the narrow preland of the orifice.

16. The apparatus of claim 11, further comprising means for increasing the melt flow rate of the polymer in the extruder by feeding peroxide to the extruder.

17. The apparatus of claim 16, wherein the means for increasing the melt flow rate can increase the melt flow rate of the polymer exiting the extruder to a melt flow rate greater than about 30.

18. The apparatus of claim 16, wherein the narrow preland of each orifice in the die has a diameter of about 1.7 millimeters and a length of about 15 to about 21 millimeters.

19. The apparatus of claim 18, wherein the wider final hole of each orifice in the die has a diameter of about 3.2 millimeters.

20. The apparatus of claim 16, wherein each orifice in the die has an initial large diameter opening and a portion of gradually decreasing diameter that connects the initial large opening to the narrow preland of the orifice.

21. An improved die for underwater pelletization of polymers, the die having a plurality of orifices arranged on an annular cutting surface such that rotating knife blades can cut polymer strands exiting the orifices, the improvement comprising orifices that are configured to have a first portion defining narrow prelands followed by a second portion defining a wide final hole.

22. The die of claim 21, wherein the narrow preland of each orifice in the die has a diameter of about 1.7 millimeters and a length of about 15 to about 21 millimeters.

23. The die of claim 22, wherein the wider final hole of each orifice in the die has a diameter of about 3.2 millimeters.

24. The die of claim 21, wherein each orifice in the die has an initial large diameter opening that gradually decreases to the diameter of the narrow preland of the orifice.

* * * * *